(12) United States Patent
Stenton

(10) Patent No.: US 6,850,372 B1
(45) Date of Patent: Feb. 1, 2005

(54) ORTHOGONAL MOVEMENT LATERAL SHIFT ZOOM LENS

(75) Inventor: Conrad Stenton, Midland (CA)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/174,783

(22) Filed: Jun. 18, 2002

(51) Int. Cl.[7] .............................................. G02B 15/14
(52) U.S. Cl. ....................................... 359/676; 359/432
(58) Field of Search ................................ 359/676, 381, 359/554–557, 422, 432, 708; 396/85; 348/211.9, 240.99

(56) References Cited

U.S. PATENT DOCUMENTS

| 4,925,281 A | 5/1990 | Baker ......................... 359/676 |
| 6,172,740 B1 * | 1/2001 | Suzuki ......................... 355/53 |
| 6,278,558 B1 | 8/2001 | Chang ......................... 359/676 |
| 2003/0053034 A1 * | 3/2003 | Yaniv ......................... 353/31 |

OTHER PUBLICATIONS

60323435.*

* cited by examiner

Primary Examiner—Mark A. Robinson
Assistant Examiner—Lee Fineman

(74) Attorney, Agent, or Firm—William C. Schubert; Karl A. Vick

(57) ABSTRACT

An optical zoom lens mechanism is arranged along an optical axis and produces a zooming effect by a transverse movement of transparent elements perpendicular to the optical axis. A first lens group has two adjacent, rotationally nonsymmetric transparent first optical lens plates that are each rotationally nonsymmetric relative to the optical axis, and a first-group drive is operable to move the first optical lens plates together and relative to each other in a first-movement radial direction relative to the optical axis. A second lens group has two adjacent, rotationally nonsymmetric transparent second optical lens plates that are each rotationally nonsymmetric relative to the optical axis, and a second-group drive is operable to move the second optical lens plates together and relative to each other in a second-movement radial direction relative to the optical axis. The second-movement radial direction is angularly rotated from the first-movement radial direction by a nonzero, preferably about 90 degrees, rotational angle about the optical axis. The first optical lens plates and the second optical lens plates are shaped so that the relative movement of the first optical lens plates and second optical lens plates produces an optical zoom relative to a focal surface. The drives may be driven by a controller, such as a feedback controller having an imaging sensor located at the focal surface, and a microprocessor controller receiving an output of the imaging sensor and having a control output signal set operably connected to the drives.

18 Claims, 2 Drawing Sheets

ORTHOGONAL MOVEMENT LATERAL SHIFT ZOOM LENS

This invention relates to a lateral shift zoom lens and, more particularly, to controlling the shifting of the optical axis during optical zooming of the lens.

BACKGROUND OF THE INVENTION

Conventional optical zoom lenses function by moving sets of powered lens elements relative to each other along an optical axis. That is, the rotationally symmetric lens elements controllably move closer together and farther apart. This relative movement alters the focal length of the set of lens elements, producing a change in magnification of the set of lens elements and thence the zoom effect.

Another type of zoom lens, termed herein a "lateral shift zoom lens", achieves the zooming effect by movement of multiple pairs of optical lens plates perpendicular to the optical axis. The lateral shift zoom lens, described in U.S. Pat. No. 4,925,281, utilizes rotationally nonsymmetric optical lens plates. The optical lens plates have shapes selected such that, when the pairs of optical lens plates are moved laterally relative to each other in a coordinated fashion, the focal length of the lens set changes. The shapes of the optical lens plates are selected such that the focal surface remains a focal plane, and so that the image remains in focus at the focal plane as the focal length and thence the magnification of the zoom lens changes. The lateral shift zoom lens has the advantage over conventional axial shift zoom lenses that the space required by the zoom lens does not lengthen as the zooming effect is achieved. The lateral shift zoom lens has limitations relative to conventional axial shift zoom lens in image quality, boresight pointing of the optical axis, and zooming range due to the asymmetric structure of the optical lens plates.

There is a need for an improved approach to lateral shift zoom lenses that would overcome at least some of the limitations of the current versions of the lateral shift zoom lens. The present invention fulfills this need, and further provides related advantages.

The present invention provides a zoom lens that achieves the zooming effect by translating lens plates perpendicular to, rather than parallel to, the optical axis. Additionally, the present approach provides control over the boresight pointing of the optical axis of the zoom lens. The optical axis may be held in a fixed direction or controllably pointed in a selected direction.

In accordance with the invention, an optical zoom lens mechanism arranged along an optical axis comprises a first lens group comprising at least two (and preferably exactly two) adjacent transparent first optical lens plates that are each rotationally nonsymmetric relative to the optical axis, and a first-group drive operable to move the first optical lens plates together and also by a first relative movement to each other in a first-movement radial direction relative to the optical axis. The optical zoom lens mechanism further includes a second lens group comprising at least two (and preferably exactly two) adjacent transparent second optical lens plates that are each rotationally nonsymmetric relative to the optical axis. The second lens group is spaced apart from the first lens group in an axial direction along the optical axis. A second-group drive is operable to move the second optical lens plates together and also by a second relative movement to each other in a second-movement radial direction relative to the optical axis. The first optical lens plates and the second optical lens plates are shaped so that the first relative movement of the first optical lens plates and the second relative movement of the second optical lens plates produces an optical zoom relative to a focal surface. There may be, and usually is, at least one additional lens lying on the optical axis.

The second-movement radial direction is angularly rotated from the first-movement radial direction by a nonzero rotational angle about the optical axis. The nonzero rotational angle is preferably at least 45 degrees. Most preferably, the nonzero rotational angle is about 90 degrees.

The first-group drive may be structured to produce a linear relative movement of the first optical lens plates. The first-group drive may instead be structured to produce a rotational relative movement of the first optical lens plates about a rotation axis parallel to but spaced apart from the optical axis. The second-group drive may also be a linear or rotational drive.

Each optical lens plate may be made of glass or other lens material that is transparent to visible light. The lens plates may instead be made of a material transparent to other wavelengths, such as silicon for infrared light.

To control the movement of the lens plates, there is preferably a microprocessor controller having a control output signal set operably connected to the first-group drive and to the second-group drive. In one embodiment, the microprocessor controller works from information developed during calibration procedures and stored in memory to select the positions to which the lens plates are driven to achieve any required combination of optical zooming and optical axis orientation. In another embodiment, the controller is a feedback controller comprising an imaging sensor, such as an imaging sensor located at the focal surface, and a microprocessor controller receiving an output of the imaging sensor and having a control output signal set operably connected to the first-group drive and to the second-group drive.

The lens plates in the two sets of lens groups are oriented and moved by their respective drives so that the relative movement has an orthogonal (perpendicular) component as between the two sets of lens groups. This orthogonal relative movement allows the pointing direction of the optical axis to be controllably set. The control of the direction of the optical axis may be used to keep the pointing direction fixed as the lens plates are moved to change the focal length of the zoom lens and thence achieve the zooming effect. The control of the direction of the optical axis may instead be used to aim the optical axis of the zoom lens in a selected direction.

This capability to both set the zooming conditions and control the direction of the optical axis greatly improves the potential utility of the lateral shift zoom lens. In the prior versions of the lateral shift zoom lens, the optical axis shifts uncontrollably as the lens plates are moved to effect the zoom action. This shifting of the optical axis is not a concern in some applications, but in others the precise position of features in the field of view relative to the boresight of the zoom lens must be known. The present approach achieves that result.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
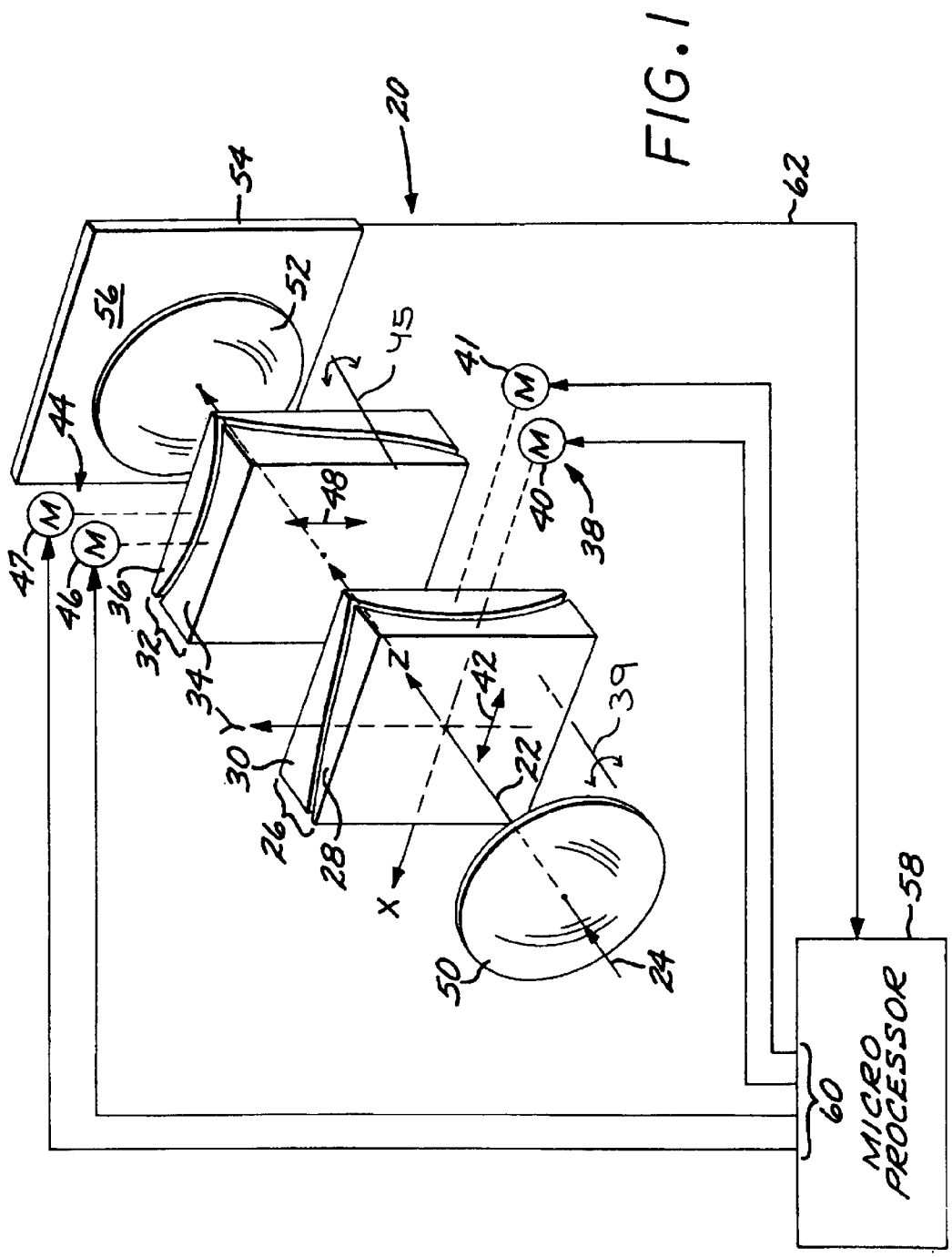
FIG. 1 is a schematic perspective view of a zoom lens mechanism.

FIG. 1 depicts an optical zoom lens mechanism 20 arranged along an optical axis 22. As shown in FIG. 1, the optical axis 22 along which a light beam 24 is propagated lies coincident with a z-axis that is a boresight of the optical system. Absent the present approach, the optical axis 22 may shift away from the z-axis in an uncontrolled fashion as the optical zoom lens mechanism 20 operates. An x-axis and an orthogonal y-axis define a plane perpendicular to the z-axis, the optical axis 22, and the light beam 24. The optical zoom lens mechanism 20 comprises a first lens group 26 with at least two, and here illustrated as exactly two, adjacent transparent first optical lens plates 28 and 30. The first optical lens plates 28 and 30 are each rotationally nonsymmetric relative to the optical axis 22. That is, the lenses in conventional axial-translation zoom lenses are generally cylindrically symmetric when rotated about the optical axis. That is not the case for the first optical lens plates 28 and 30.

The optical zoom lens mechanism 20 further includes a second lens group 32 comprising at least two, and here illustrated as exactly two, adjacent transparent second optical lens plates 34 and 36 that are also each rotationally nonsymmetric relative to the optical axis 22. The second lens group 32 is spaced apart from the first lens group 26 in the z-axial direction along the optical axis 22.

A first-group drive 38, here depicted as a first-group first electric stepper motor 40 and a first-group second electric stepper motor 41, is operable to move the first optical lens plates 28 and 30 together and also by a first relative movement to each other in a first-movement radial direction 42 relative to the optical axis 22. That is, the first optical lens plates 28 and 30 may be moved together without relative motion, or they may be moved relatively to each other. A second-group drive 44, here depicted as a second-group first electric stepper motor 46 and a second-group second electric stepper motor 47, is operable to move the second optical lens plates 34 and 36 together and also by a second relative movement to each other in a second-movement radial direction 48 relative to the optical axis 22. That is, the lens plates 34 and 36 may be moved together without relative motion, or they may be moved relatively to each other. Equivalently, the first-group drive 38 and the second-group drive 44 may be accomplished using a smaller number of drive motors and appropriate gearing or other type of combined motion/relative motion mechanism.

The first-movement radial direction 42 and the second-movement radial direction 48 both lie in the plane defined by the x-axis and the y-axis. Both radial directions 42 and 48 may be considered as extending radially from (that is, perpendicular to) the optical axis 22 (i.e., from the z-axis). With the movements in these radial directions 42 and 48, the respective first lens group 26 and second lens group 32 maintain approximately a fixed distance from each other as measured parallel to the optical axis 22.

In this approach, the two first optical lens plates 28 and 30 may be moved by the first-group drive 38 together (so that their relative position does not change) in the first-movement radial direction 42, here along the x-axis; or the two first optical lens plates 28 and 30 may be moved relative to each other (e.g., in opposite directions) in the first-movement radial direction 42. Similarly, the two second optical lens plates 34 and 36 may be moved by the second-group drive 44 together (so that their relative position does not change) in the second-movement radial direction 48, here along the y-axis; or the two second optical lens plates 34 and 36 may be moved relative to each other (e.g., in opposite directions) in the second-movement radial direction 48.

The first-group drive 38 and the second-group drive 44 are illustrated as producing a linear relative movement of their respective optical lens plates. They may instead produce a rotational relative movement of their respective optical lens plates 28, 30 and 34, 36 about respective rotation axes 39 and 45 parallel to but spaced from the optical axis 22.

The second-movement radial direction 48 is angularly rotated in the x-y plane from the first-movement radial direction 42 by a nonzero rotational angle about the optical axis 22. As a result, there is an orthogonal component to the relative movements of the first optical lens plates 28 and 30, taken together, relative to the relative movements of the second optical lens plates 34 and 36, taken together. Preferably, the rotational angle is at least 45 degrees. Most preferably and as illustrated, the rotational angle between the radial directions 42 and 48 is about 90 degrees. In that most preferred case, the first optical lens plates 28 and 30 are moved together or back and forth relative to each other by the first-group drive 38 in the first-movement radial direction 42 parallel to the x-axis. The second optical lens plates 34 and 36 are moved together or back and forth relative to each other by the second-group drive 44 in the second-movement radial direction 48 parallel to the y-axis. There is essentially no movement of either lens group 26 and 32 parallel to the z-axis.

The optical zoom lens mechanism 20 may optionally include other optical elements, such as refractive and/or reflective optical elements. In the illustrated embodiment, there is a front lens 50, a back lens 52, and a sensor, here an imaging sensor 54 such as a focal plane array. The front lens 50 and back lens 52 are representative of any operable combination of optical elements used to alter the light beam 24. Optical elements may also be placed between the first lens group 26 and the second lens group 32. In service, the light beam 24 passes sequentially through the front lens 50, the first lens group 26, the second lens group 32, and the back lens 52, and falls upon the imaging sensor 54. A front face of the imaging sensor 54 is preferably placed at a location of a focal surface 56, here illustrated as a focal plane. The focal surface 56 may be fixed or movable. Each optical lens plate 28, 30, 34, and 36, as well as other transparent lenses such as the lenses 50 and 52, are transparent and may be made of glass or other lens material that is transparent to visible light. The lens plates 28, 30, 34, and 36 and the other lenses 50 and 52 may instead be made of a material transparent to other wavelengths, such as silicon for infrared light. The sensor 54, if any, is constructed to be sensitive to the wavelengths of interest.

The lens groups 26 and 32, and their optical lens plates 28, 30, 34, and 36 are configured, shaped, and positioned axially in any operable manner so that the first relative movement 42 of the first optical lens plates 28 and 30, and the second relative movement 48 of the second optical lens plates 34 and 36 produces a change in focal length, and thence an optical zoom, relative to a focal surface 56. A preferred configuration, shaping, and axial positioning are set forth in U.S. Pat. No. 4,925,281, whose disclosure is incorporated by reference in its entirety. The additional optical elements such as the lenses 50 and 52 are configured, shaped, and positioned according, to known optics principles.

The facing surfaces of the first optical lens plates 28 and 30, and the facing surfaces of the second optical lens plates 34 and 36, are complexly shaped. The respective movements parallel to the radial directions 42 and 48 are desirably controlled by a microprocessor controller 58 having a control output signal set 60 operably connected to the first-group drive 38 and to the second-group drive 44.

The optical zoom lens mechanism may be controlled and driven in any operable manner, and two approaches are of most interest. In a first approach, during initial lens calibration a boresighting target in the form of a light source is placed at a position along the z-axis to generate the light beam 24 as a boresighting light beam. The pairs of lens plates 28, 30 and 34, 36 are moved relative to each other to create optical zooming effects. However, during such movements the apparent position of the light beam 24, as sensed by the imaging sensor 54, shifts. To null that shift, the first lens group 26 and the second lens group 32 are moved (without relative movements in their respective pairs of lens plates 28, 30 and 34, 36) until the apparent position of the boresighting light beam 24 is moved back to its proper boresighted position. Similarly, the same approach may be used to shift the optical axis 22 to other angular orientations away from the boresight z-axis so as to "aim" the optical axis 22 to other selected positions. The positions of the lens plates 28, 30, 34, and 36 to achieve both the specified optical zooming and also the specified position of the optical axis 22 are recorded, as for example in a lookup table accessible to the microprocessor controller 58. Later, in service, when a particular viewing condition is required, the microprocessor controller 58 finds in the lookup table the desired sets of positions for each required optical zooming and each required position of the optical axis, and drives the stepper motors 40, 41, 46, and 47 (or other driving mechanism) to those positions.

In another approach, the microprocessor controller 58 receives a signal output 62 of the imaging sensor 54. The microprocessor controller 58 thus acts as a feedback controller to control the positions of the optical lens plates 28 and 30, and 34 and 36, responsive to the image sensed by the imaging sensor. This feedback control permits the optical axis 22 to be aimed as desired, either maintained in a fixed boresight direction, or steered as desired within the limits permitted by the designs and movements of the lens groups 26 and 32, as long as some reference is available.

Figure 2:
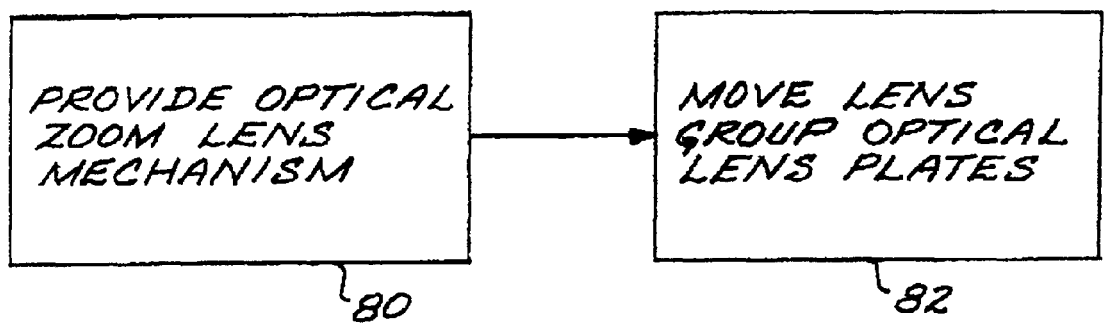
FIG. 2 is a block flow diagram of an approach for practicing the invention.

FIG. 2 depicts a preferred approach for practicing the invention. A suitable optical zoom lens mechanism is provided, step 80. The preferred optical zoom lens mechanism is that described above as element 20, but other operable forms may be used. The optical zoom lens mechanism is operated, step 82, to move the first optical lens plates 28, 30 together and/or relative to each other parallel to the first-movement radial direction 42, and to move the second optical lens plates 34, 36 together and/or relative to each other parallel to the second-movement radial direction 48, as described herein. A zooming optical effect is achieved, and the pointing direction of the optical axis 22 is also steered, either to be maintained fixed in space or directed in a desired direction.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An optical zoom lens mechanism arranged along an optical axis, comprising:
    a first lens group comprising at least two adjacent transparent fist optical lens plates that are each rotationally nonsymmetric relative to the optical axis;
    a first-group drive operable to move the first optical lens plates together and also by a first relative movement to each other in a first-movement radial direction relative to the optical axis;
    a second lens group comprising at least two adjacent transparent second optical lens plates that are each rotationally nonsymmetric relative to the optical axis, wherein the second lens group is spaced apart from the first lens group in an axial direction along the optical axis; and
    a second-group drive operable to move the second optical lens plates together and also by a second relative movement to each other in a second-movement radial direction relative to the optical axis, wherein the second-movement radial direction is angularly rotated from the first-movement radial direction by a rotational angle about the optical axis of about 90 degrees, and
    wherein the fist optical lens plates and the second optical lens plates are shaped so that the first relative movement of the first optical lens plates and the second relative movement of the second optical lens plates produces an optical zoom relative to a focal surface.

2. The optical zoom lens mechanism of claim 1, wherein the first-group drive produces a linear relative movement of the first optical lens plates.

3. The optical zoom lens mechanism of claim 1, wherein the first-group drive produces a rotational relative movement of the first optical lens plates about a rotation axis parallel to but spaced apart from the optical axis.

4. The optical zoom lens mechanism of claim 1, wherein the at least two first optical lens plates are exactly two first optical lens plates.

5. The optical zoom lens mechanism of claim 1, wherein the at least two second optical lens plates are exactly two second optical lens plates.

6. The optical zoom lens mechanism of claim 1, wherein each optical lens plate is made of glass.

7. The optical zoom lens mechanism of claim 1, further including
    a microprocessor controller having a control output signal set operably connected to the first-group drive and to the second-group drive.

8. The optical zoom lens mechanism of claim 1, further including a feedback controller comprising
    an imaging sensor upon which a light beam passing through the first lens group and the second lens group falls, and
    a microprocessor controller receiving an output of the imaging sensor and having a control output signal set operably connected to the first-group drive and to the second-group drive.

9. The optical zoom lens mechanism of claim 8, wherein the imaging sensor is positioned at the focal surface.

10. The optical zoom lens mechanism of claim 1, further including
    at least one additional lens lying on the optical axis.

11. An optical zoom lens mechanism arranged along an optical axis, comprising:
    a first lens group comprising at least two adjacent transparent first optical lens plates that ane each rotationally nonsymmetric relative to the optical axis;
    a first-group drive operable to move the first optical lens plates together and also by a first relative movement to each other in a first-movement radial direction relative to the optical axis;

a second lens group comprising at least two adjacent transparent second optical lens plates that are each rotationally nonsymmetric relative to the optical axis, wherein the second lens group is spaced apart from the first lens group in an axial direction along the optical axis;

a second-group drive operable to move the second optical lens plates together and also by a second, relative movement to each other in a second-movement radial direction relative to the optical axis, wherein the second-movement radial direction is angularly rotated from the first-movement radial direction by a rotation angle of about 90 degrees about the optical axis, wherein the first optical lens plates and the second optical lens plates are shaped so that the relative movements of the first optical lens plates and second optical lens plates produce an optical zoom relative to a focal surface; and a feedback controller comprising
an imaging sensor located at the focal surface, and
a controller receiving an output of the imaging sensor and having a control output signal set operably connected to the first-group drive and to the second-group drive.

12. The optical zoom lens mechanism of claim 11, wherein the first-group drive produces a linear relative movement of the first optical lens plates.

13. The optical zoom lens mechanism of claim 11, wherein the first-group drive produces a rotational relative movement of the first optical lens plates about a rotation axis parallel to but spaced apart from the optical axis.

14. The optical zoom lens mechanism of claim 11, wherein the at least two first optical lens plates are exactly two first optical lens plates.

15. The optical zoom lens mechanism of claim 11, wherein the at least two second optical lens plates are exactly two second optical lens plates.

16. The optical zoom lens mechanism of claim 11, wherein each optical lens plate is made of glass.

17. The optical zoom lens mechanism of claim 11, wherein the controller is a microprocessor controller.

18. The optical zoom lens mechanism of claim 11, further including
at least one additional lens lying on the optical axis.

* * * * *